(12) United States Patent
Tokita (10) Patent No.: US 6,365,981 B1
(45) Date of Patent: Apr. 2, 2002

(54) POWER GENERATION SYSTEM WITH FLYWHEEL APPARATUS

(76) Inventor: Mamoru Tokita, 4-304, 4-24-5, Nishimizue, Edogawa-ku, Tokyo (JP)

( * ) Notice: Subject to any disclaimer, the term of this patent is extended or adjusted under 35 U.S.C. 154(b) by 0 days.

(21) Appl. No.: 09/444,017

(22) Filed: Nov. 19, 1999

(51) Int. Cl.[7] .................................................. H02K 7/06
(52) U.S. Cl. ......................................... 290/1 R; 322/4
(58) Field of Search ................................ 290/1 R, 1 A; 322/3, 4

(56) References Cited

U.S. PATENT DOCUMENTS

| | | | | |
|---|---|---|---|---|
| 4,282,443 A | * | 8/1981 | Seidl ........................... 290/1 R |
| 5,077,515 A | * | 12/1991 | St. Arnauld ..................... 322/4 |
| 5,384,521 A | * | 1/1995 | Coe ............................ 318/161 |
| 5,845,731 A | * | 12/1998 | Buglione et al. ........... 180/65.2 |
| 6,109,029 A | * | 8/2000 | Voweles et al. ................ 60/398 |

* cited by examiner

*Primary Examiner*—Nicholas Ponomarenko
(74) *Attorney, Agent, or Firm*—Christensen O'Connor Johnson & Kindness PLLC (57) ABSTRACT

The present invention is a power generation system comprising a power generator and a flywheel apparatus. The flywheel apparatus has a frame, a flywheel section and an exciting section. The flywheel section has an input unit having the input shaft, first and second flywheel units having the output shaft, and first and second drive units for transmitting the rotary force of the input unit to the first and second flywheel units. The exciting section increases the flywheel effect of the flywheel section.

12 Claims, 7 Drawing Sheets

POWER GENERATION SYSTEM WITH FLYWHEEL APPARATUS

BACKGROUND OF THE INVENTION

The present invention relates to a power generation system for converting the natural energy such as the force of water or wind to the electric energy and, more particularly, to a power generation system comprising a flywheel apparatus.

As for the prior art of this kind of the power generation system, a hydroelectric generation system will be explained. As an example of the hydroelectric generation system, water in a reservoir is made to flow downward through a tube, a waterwheel serving as a prime mover is turned by the force of the water flowing in the tube, and a power generator is operated in accordance with the rotary force of the waterwheel to generate the power.

In such a hydroelectric generation system, the quantity and rate of the water flowing in the tube are varied in accordance with weather conditions and the like. To compensate for this variation, adjustment mechanisms such as valves, serge tanks, guide vanes and the like are provided around the tube or the waterwheel, so that the rotary force obtained from the waterwheel can reach a predetermined value. The adjustment mechanisms aim to restrict the variation of the water flow which is regarded as the energy of the natural world and to effectively operate the prime mover.

Next, a wind power system using a windmill as its prime mover will be reviewed.

The wind power system is constituted by a windmill, a power generator and the like, so as to supply the rotation of the windmill serving as a prime mover to the power generator. The adjustment mechanisms applicable to the wind power system are a mechanism for changing the direction of the windmill in accordance with the direction of the wind, a mechanism for changing the angle of the fans of the windmill, accelerating gears provided between the windmill and the power generator, and the like.

The adjustment mechanisms in the above-described hydroelectric power system or wind power system are elements for effective conversion of the energy of the natural world into the electric energy.

On the other hand, recently, necessity for this kind of the adjustment mechanisms have been increased, from the viewpoint of the use of various energies, the improvement of the efficiency of power generation and the like, in the small power generation system which has been largely developed. That is, when the mechanisms which do not limit their energy sources or various adjustment mechanisms having the forms are realized, the power generation system can be diversified or the efficiency of power generation can be improved. For this reason, the emergence of the power generation system comprising a novel adjustment mechanism which can be applied to the above-described hydroelectric generation system or wind power system has been expected.

BRIEF SUMMARY OF THE INVENTION

The object of the present invention is to provide a power generation system comprising a novel adjustment mechanism and being capable of effectively taking the energy of the natural world such as wind and a water flow and converting the energy into electric energy.

This object can be achieved by the following power generation system. That is, the present invention comprises a novel adjustment mechanism. The adjustment mechanism is a flywheel apparatus having an exciting section. In the flywheel apparatus having the exciting section, the shaft of the flywheel is made eccentric in accordance with the rotation of the shaft of the flywheel, to increase the flywheel effect and restrict the vibration.

The power generation system of the present invention thus operated comprises a power generator; and a flywheel apparatus having an input shaft and an output shaft to receive a rotary force from outside via the input shaft and supply the rotary force to the power generator via the output shaft.

The flywheel apparatus comprises a frame; a flywheel section being provided at the frame, and comprising an input unit having the input shaft for receiving the rotary force from the outside, a flywheel unit having the output shaft, and a drive unit for transmitting the rotary force from the input unit to the flywheel unit; and an exciting section provided at the frame, for increasing a flywheel effect of the flywheel section.

The input unit of the flywheel section comprises bearings provided at the frame; a first shaft serving as the input shaft, supported by the bearings; an input pulley provided at the first shaft, for receiving the rotary force from the outside; and a first pulley provided at the first shaft.

The drive unit of the flywheel section comprises bearings provided at the frame; a second shaft supported by the bearings; a second pulley provided at the second shaft; a first belt looped over the first pulley and the second pulley; and a support cylinder provided at the second shaft.

The flywheel unit of the flywheel section comprises a support rod having an end fixed at the support cylinder; a connection cylinder at which another end of the support rod is fixed; a third shaft serving as an output shaft passing through the connection cylinder; a third pulley provided at the third shaft; a second belt looped over the second pulley and the third pulley; and a flywheel disk provided at the third shaft.

The exciting section comprises a drive unit constituted by bearings provided at the frame, a cum shaft supported by the bearings, a fourth pulley provided at the cum shaft, and a third belt looped over the first pulley and the fourth pulley; and a cum unit being provided at the cum shaft, and having one end exciting to allow the connection cylinder to reciprocate in accordance with the rotation of the cum shaft.

In the flywheel apparatus having the exciting section according to the power generation system of the present invention. The shaft of the flywheel is made eccentric in accordance with the rotation of the shaft of the flywheel, to increase the flywheel effect and restrict the vibration. Thus, the rotation can be further smoothed by the increase in the flywheel effect, the energy to be stored in the flywheel can be increased as compared to a flywheel without the eccentricity, and the mechanical loss can be further reduced by the restriction of the vibration.

Therefore, according to the power generation system of the present invention, the energy of various energy sources such as the forces of water, wind and the like can be converted into the rotary energy by a prime mover, the rotary energy of the prime mover can be effectively taken via the input shaft, the mechanical loss can be further reduced, and thereby the efficiency of power generation can be enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A power generation system according to an embodiment of the present invention will be explained with reference to FIGS. 1 to 5.

Figure 1:
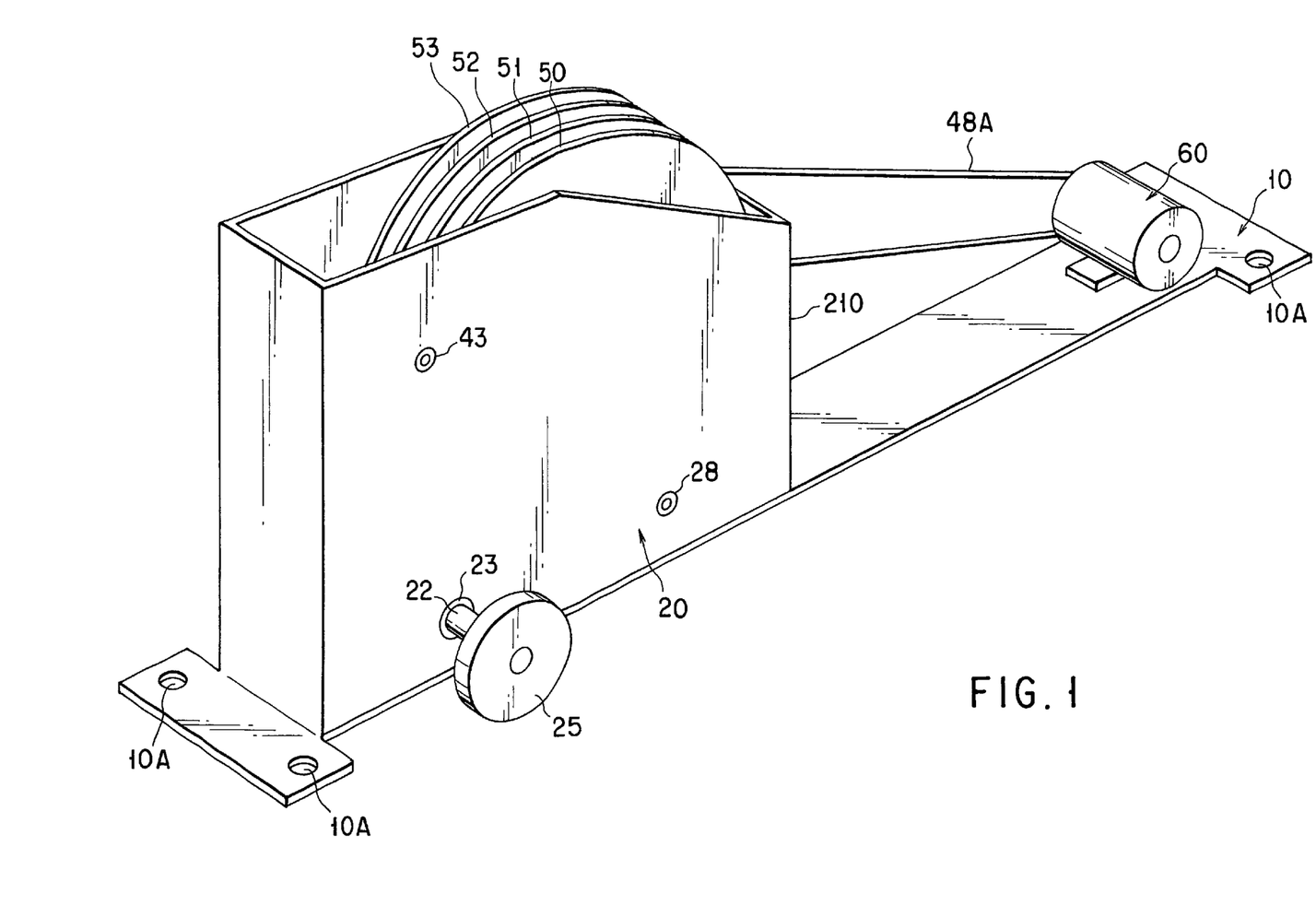
FIG. 1 is a perspective view showing a power generation system according to an embodiment of the present invention.
Figure 2:
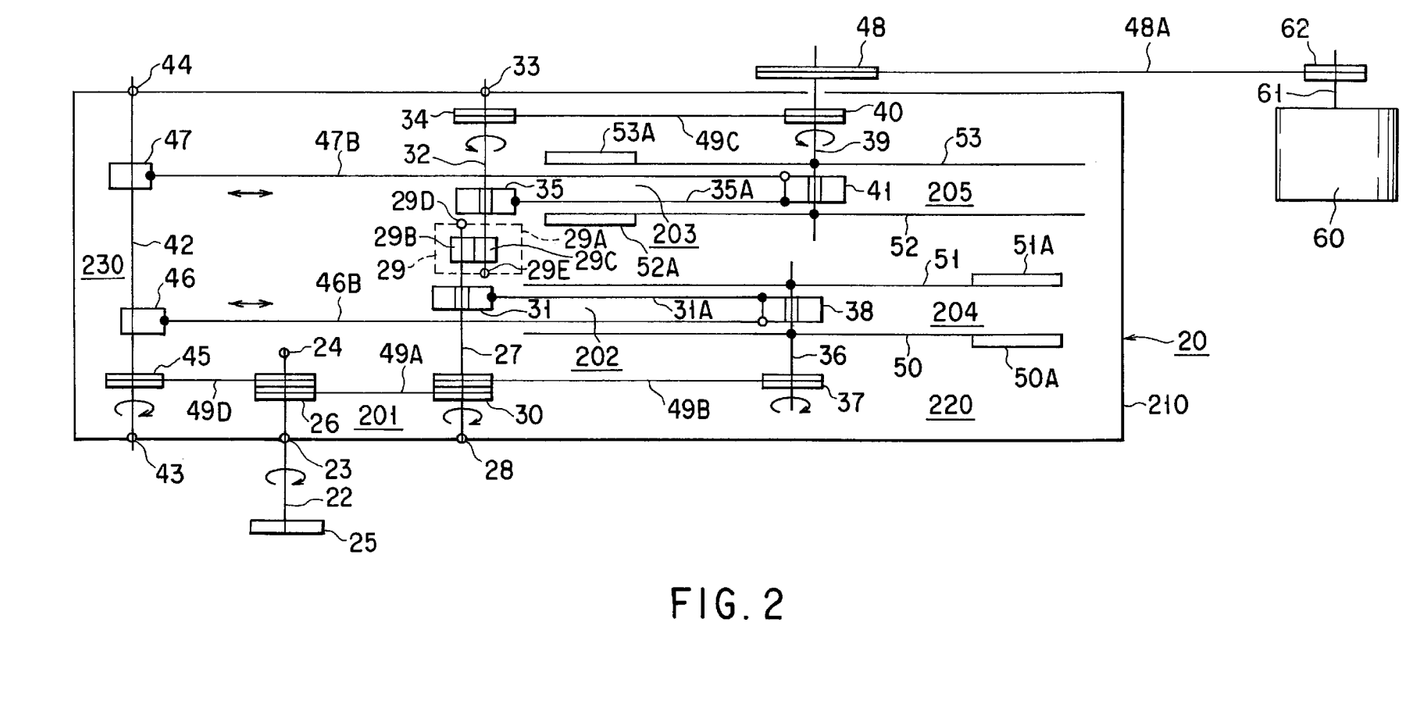
FIG. 2 is a diagram showing the power transmission of the embodiment.

The power generation system of the embodiment comprises a base 10, a power generator 60 and a flywheel apparatus 20 as shown in FIGS. 1 and 2. A fixed element attachment hole 10A is formed at the base 10. The flywheel apparatus 20, which is provided on the base 10, comprises an input shaft 22 and an output shaft 39, receives a rotary force from the outside via the input shaft 22, and supplies the rotary force to the power generator 60 via the output shaft 39. The power generator 60 has a rotary shaft 61 and a pulley 62 provided at the rotary shaft 61.

Figure 3:
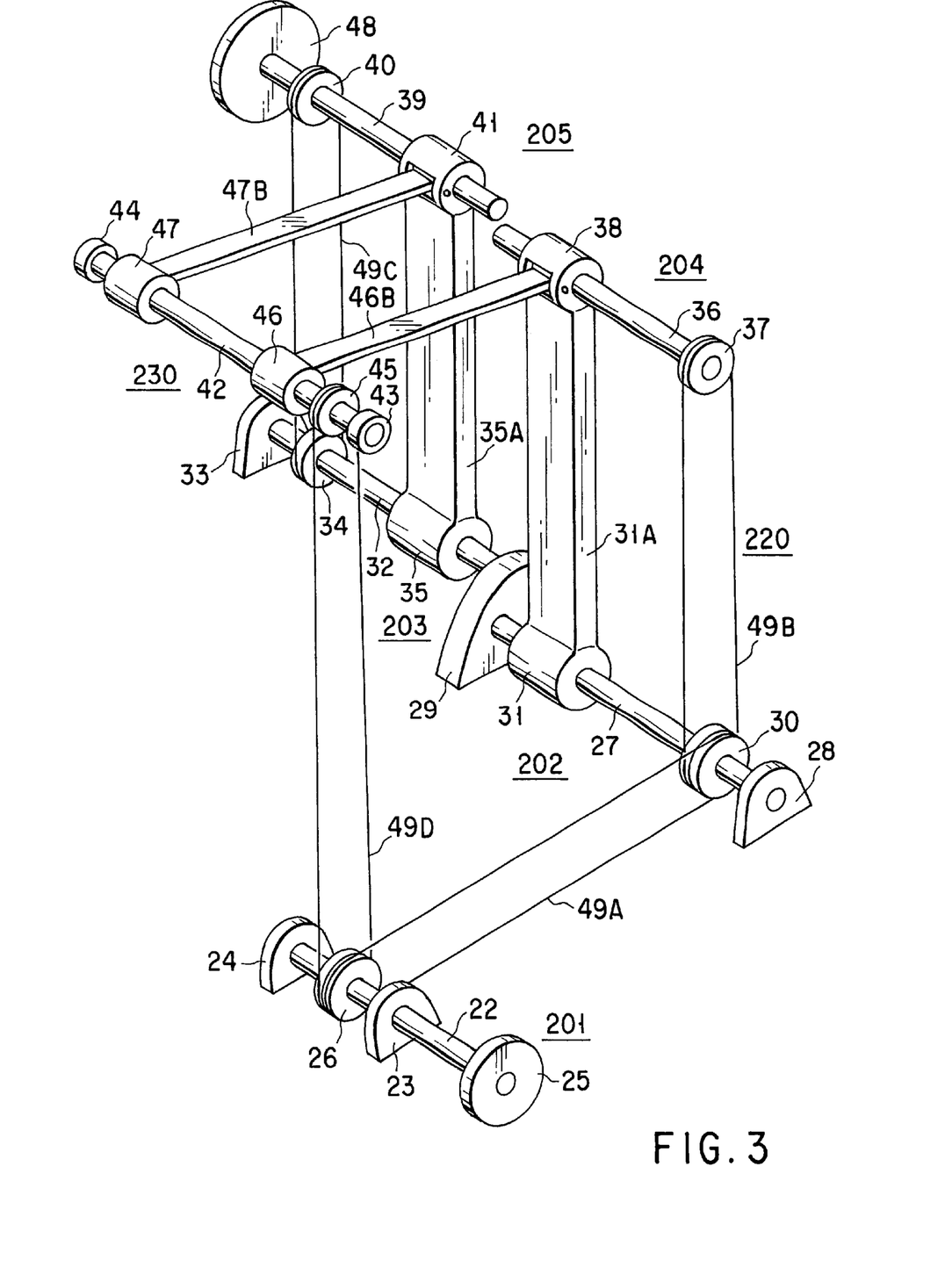
FIG. 3 is a perspective view schematically showing the structure of each member in the embodiment.

In the power generation system of the present embodiment, the flywheel apparatus 20 comprises a frame 210 provided at the base 10, a flywheel section 220 provided at the frame 210, and an exciting section 230 provided at the frame 210 to increase the flywheel effect of the flywheel section 220, as shown in FIGS. 2 and 3.

The flywheel section 220 has an input unit 201, a first drive unit 202, a second drive unit 203, a first flywheel unit 204 and a second flywheel unit 205.

The input unit 201 of the flywheel section 220 comprises a first bearing 23 and a second bearing 24 which are provided at the frame 210, a first shaft 22 which serves as an input shaft supported by the first bearing 23 and the second bearing 24, an input pulley 25 provided at the first shaft 22 to receive the rotary force from the outside, and a first pulley 26 provided at the first shaft 22.

Figure 4:
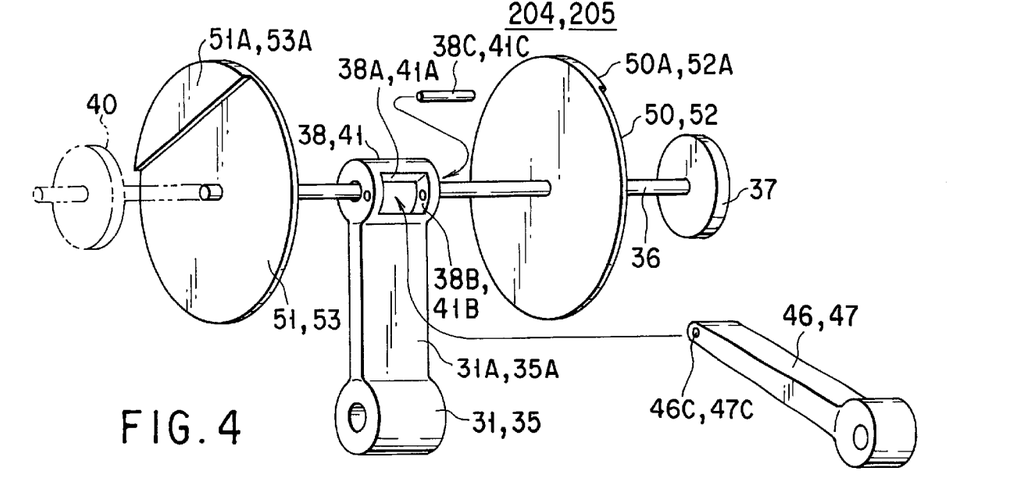
FIG. 4 is a perspective view schematically showing first and second flywheel units of the embodiment.

As shown in FIGS. 2 to 4, the first drive unit 202 of the flywheel section 220 comprises a third bearing 28 and a fourth bearing 29D which are provided at the frame 210, a second shaft 27 supported by the third bearing 28 and the fourth bearing 29D, a first gear 29B provided at the second shaft 27, a second pulley 30 provided at the second shaft 27, a first belt 49A looped over the first pulley 26 and the second pulley 30, and a first support cylinder 31 provided at the second shaft 27.

Further, as shown in FIGS. 2 to 4, the second drive unit 203 of the flywheel section 220 comprises a fifth bearing 33 and a sixth bearing 29E which are provided at the frame 210, a third shaft 32 supported by the fifth bearing 33 and the sixth bearing 29E, a second gear 29C which is provided at the third shaft 32, engaged with the first gear 29B of the first drive unit 202 and rotated in a direction opposite to the direction of the first gear 29B, a third pulley 34 provided at the third shaft 32, and a second support cylinder 35 provided at the third shaft 32.

The first gear 29B, the second gear 29C, the four bearing 29D and the sixth bearing 29E are provided in a casing 29A and thus constitute a gear unit 29.

Further, as shown in FIGS. 2 to 4, the first flywheel unit 204 of the flywheel section 220 comprises a first support rod 31A having one end fixed at the first support cylinder 31, a first connection cylinder 38 at which another end of the first support rod 31A is fixed and which has a first recess portion 38A and a first pin hole 38B, a fourth shaft 36 which is provided to insert through the first connection cylinder 38, a fourth pulley 37 provided at the fourth shaft 36, a second belt 49B looped over the second pulley 30 and the fourth pulley 37, a first disk 50 and a second disk 51 which are provided at the fourth shaft 36, a first weight 50A and a second weight 51A which are provided respectively at the first disk 50 and the second disk 51, and a first fixing pin 38C which is inserted into the first pin hole 38B of the first connection cylinder 38.

The first support cylinder 31, the first support rod 31A and the first connection cylinder 38 are formed to be integral by the welding or molding.

Further, as shown in FIGS. 2 to 4, the second flywheel unit 205 of the flywheel section 220 comprises a second support rod 35A having one end fixed at the second support cylinder 35, a second connection cylinder 41 at which another end of the second support rod 35A is fixed and which has a second recess portion 41A and a second pin hole 41B, a fifth shaft 39 serving as an output shaft which is provided to insert through the second connection cylinder 41 and at which an output pulley 48 is provided, a fifth pulley 50 provided at the fifth shaft 39, a third belt 49C looped over the third pulley 34 and the fifth pulley 40, a third disk 52 and a fourth disk 53 which are provided at the fifth shaft 39, a third weight 52A and a fourth weight 53A which are provided respectively at the third disk 52 and the fourth disk 53, and a second fixing pin 41C inserted into the second pin hole 41B of the second connection cylinder 41.

The second support cylinder 35, the second support rod 35A and the second connection cylinder 41 are formed to be integral by the melting, welding or the like.

As shown in FIGS. 2 to 5, the exciting section 230 comprises a seventh bearing 43 and an eighth bearing 44 which are provided at the frame 210, a cum shaft 42 supported by the seventh bearing 43 and the eighth bearing 44, a sixth pulley 45 provided at the cum shaft 42, a fourth belt 48D looped over the first pulley 26 and the sixth pulley 45, a first cum mechanism 46, and a second cum mechanism 47.

Figure 5:
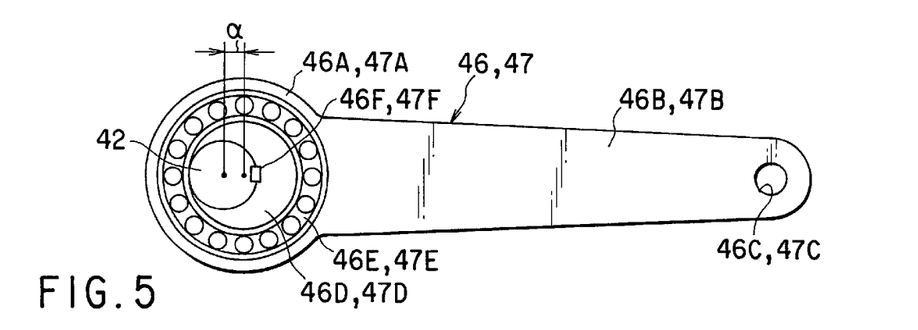
FIG. 5 is a front view schematically showing first and second cum mechanisms of the embodiment.

The first cum mechanism 46 comprises a first eccentric cum plate 46D provided at the cum shaft 42, a first pin 46F for fixing the first eccentric cum plate 46D at the cum shaft 42, a first cum bearing 46E having the first eccentric cum plate 46D provided at its inner peripheral side, a first cum receiver 46A provided at the inner peripheral side of the first cum bearing 46E, and a first cum rod 46B which has an end connected to the first cum receiver 46A and also has another end having a third pin hole 46C, another end being fixed to be rotatable at the first recess portion 38A of the first connection cylinder 38 by the first pin hole 38B, the third pin hole 46C and the first fixing pin 38B.

The first cum receiver 46A and the first cum rod 46B are formed to be integral by the melting, welding or the like. The quantity of eccentricity of the first cum mechanism 46 is a . In the first cum mechanism 46, one of the ends of the first cum rod 46B is supported to be rotatable t the first connection cylinder 38 and, therefore, the first connection cylinder 38 can swing at the eccentricity of α by rotating the cum shaft 42.

The second cum mechanism 47 comprises a second eccentric cum plate 47D provided at the cum shaft 42, a second pin 47F for fixing the second eccentric cum plate 47D at the cum shaft 42, a second cum bearing 47E having the second eccentric cum plate 47D provided at its inner peripheral side, a second cum receiver 47A provided at the inner peripheral side of the second cum bearing 47E, and a second cum rod 47B which has an end connected to the second cum receiver 47A and also has another end having a fourth pin hole 47C, another end being fixed to be rotatable at the second recess portion 41A of the second connection cylinder 41 by the second pin hole 41B, the fourth pin hole 47C and the second fixing pin 41C.

The second cum receiver 47A and the second cum rod 47B are formed to be integral by the melting, welding or the like. The quantity of eccentricity of the second cum mechanism 47 is α similarly to that of the first cum mechanism 46. In the second cum mechanism 47, one of the ends of the second cum rod 47B is supported to be rotatable at the second connection cylinder 41 and, therefore, the second connection cylinder 41 can swing at the eccentricity of α by rotating the cum shaft 42.

When the base 10 is elongated horizontally, the shafts 22, 27, 32, 36, 39 and 42 serve as horizontal shafts. Otherwise, one or all of the shafts 22, 27, 32, 36, 39 and 42 can serve as vertical shafts regardless of the type of the base 10 and the frame 210. Of course, some of the shafts 22, 27, 32, 36, 39 and 42 can serve as horizontal shafts while the others can be vertical shafts. This depends on whether the disks 50, 51, 52 and 53 are rotated in a horizontal plane or a vertical plane, or they can be arbitrarily selected on the basis of the various elements such as the magnitude of the input energy from the prime mover, installation style of the system, and the like.

The belts 49A, 49B, 49C and 49D has both a function of a power transmitting member, of transmitting the power, and a function of a timing belt, of determining the operation timing in each session.

In FIGS. 1 to 5, the positions of the sections, units and members are adjusted so that the explanations can be simplified. In FIG. 3, the disks 50, 51, 52 and 53 are not shown in order to clearly describe the inner structure of the flywheel section 220, but it can be easily understood from FIG. 4 that the disks 50 and 51 are fixed at the shaft 36 at both sides of the connection cylinder 38 and that the disks 52 and 53 are fixed at the shaft 39 at both sides of the connection cylinder 41.

Next, operations of the above-constituted embodiment will be explained with reference to FIGS. 1 to 5, 6, 7A to 7H, 8A and 8B. First, when, for example, the clockwise rotation of a prime mover such as a waterwheel, a windmill and the like is provided to the input pulley 25 of the input unit 201, the clockwise rotation of the input pulley 25 allows the shaft 27 of the first drive unit 202 to be rotated in the clockwise direction via the shaft 22, the pulley 26, the belt 49A, and the pulley 30. At the same time, the clockwise rotation of the input pulley 25 also allows the cum shaft 42 of the exciting section 230 to be rotated in the clockwise direction via the shaft 22, the pulley 26, the belt 49D and the pulley 45. Further, at the same time, the clockwise rotation of the input pulley 30 also allows the shaft 36 of the first flywheel unit 204 to be rotated in the clockwise direction via the belt 49B and the pulley 37.

Thus, the disks 50 and 51 having the weights 50A and 50B, of the first flywheel unit 204, are rotated in the clockwise direction.

Figure 6:
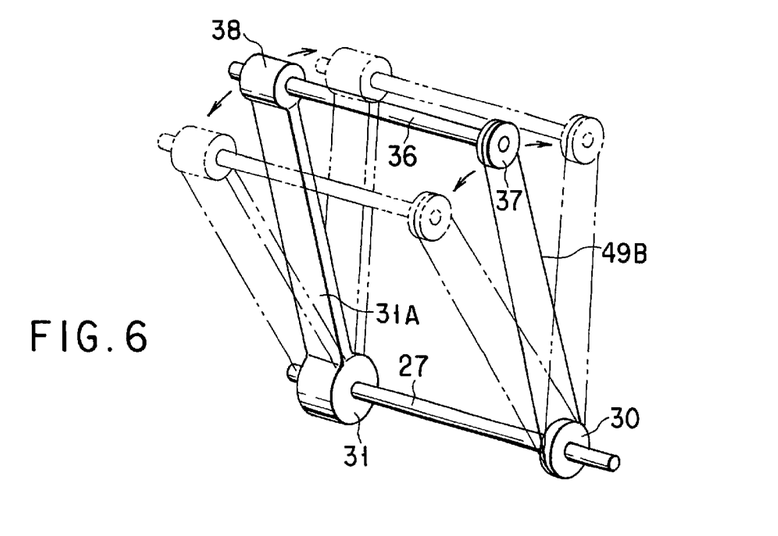
FIG. 6 is a perspective view schematically showing the operation of the first flywheel unit of the embodiment.

At this time, the connection cylinder 38 of the first flywheel unit 204 swings back and forth at the eccentricity of a by the first cum mechanism 46 of the exciting section 230 as shown in FIG. 6. Thus, the disks 50 and 51 having the weights 50A and 51A are rotated in the clockwise direction while the center of the rotation is moved back and forth by approximately α. In this case, the connection cylinder 38 and the pulley 37 similarly swing around the rotation of the shaft 27 and, therefore, the distance between the pulleys 37 and 30 is not varied and the timing function at the belt 49B is not damaged.

Then, when the shaft 27 of the first drive unit 202 is rotated in the clockwise direction, the shaft 32 of the second drive unit 203 is rotated by the gear unit 29 in the counterclockwise direction, which is opposite to the rotation direction of the shaft 27 of the first drive unit 202. Thus, the shaft 39 of the second flywheel unit 205 is rotated via the pulley 34, the belt 49C and the pulley 40 in the counterclockwise direction, which is opposite to the rotation direction of the shaft 36 of the first flywheel unit 204. Thus, the disks 52 and 53 having the weights 52A and 53A, of the second flywheel unit 205, are rotated in the counterclockwise direction.

At this time, the connection cylinder 41 of the second flywheel unit 205 swings back and forth at the eccentricity of α, by the second cum mechanism 47 of the exciting section 230. Therefore, the disks 52 and 53 having the weights 52A and 53A are rotated in the counterclockwise direction while the center of the rotation is moved back and forth by approximately α.

Next, the rotation of the disks 50 and 51, and the eccentricity at the center of their rotation will be explained with reference to FIGS. 7A and 7D.

Figure 7A:
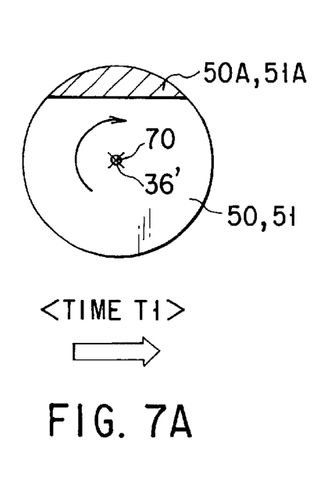
FIGS. 7A to 7H are diagrams showing the operations of the first and second flywheel units.

As shown in FIG. 7A, the weights 50A and 51A of the disks 50 and 51 are positioned at the upper side at time T1.

Figure 7B:
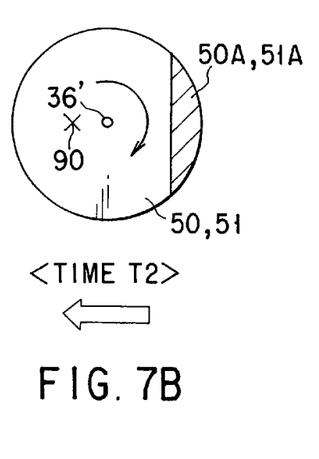

Then, as shown in FIG. 7B, the weights 50A and 51A of the disks 50 and 51 are positioned at the right side at time T2 at which the disks 50 and 51 have been rotated at ¼ in the clockwise direction. At this time, the cum rod 46B pushes the connection cylinder 38 toward the right side, which is a direction of an arrow shown in the figure, by the first cum mechanism 46 of the exciting section 230, so that a center of rotation 36' of the disks 50 and 51, which has been equivalent to a central position 90 at time T1, is shifted to the right direction from the initial central position 90 at time T2.

Figure 7C:
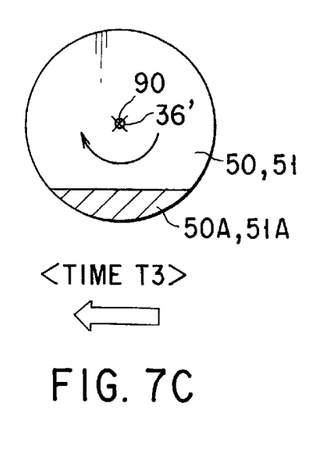

Next, as shown in FIG. 7C, the weights 50A and 51A of the disks 50 and 51 are positioned at the lower side, at time T3 at which the disks 50 and 51 have been rotated at ¼ in the clockwise direction. At this time, the cum rod 46B pulls the connection cylinder 38 toward the left side, which is a direction of an arrow shown in the figure, by the first cum mechanism 46 of the exciting section 230, so that the center of rotation 36' of the disks 50 and 51 becomes equivalent again to the initial central position 90 at time T3.

Figure 7D:
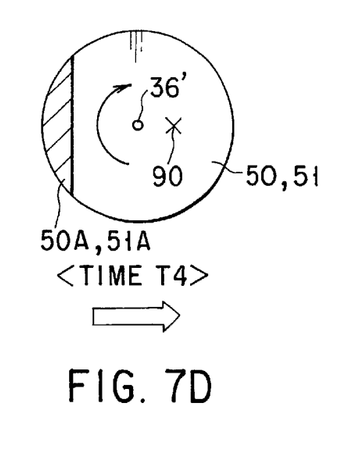

Next, as shown in FIG. 7D, the weights 50A and 51A of the disks 50 and 51 are positioned at the lower side, at time T4 at which the disks 50 and 51 have been rotated at ¼ in the clockwise direction. At this time, the cum rod 46B pulls the connection cylinder 38 toward the left side, which is a direction of an arrow shown in the figure, by the first cum mechanism 46 of the exciting section 230, so that the center of rotation 36' of the disks 50 and 51, which has been initially at the central position 90 at time T3, is shifted from the central position 90 toward the left side at time T4. Next, when the disks are rotated at ¼ in the clockwise direction, they return to the state in which they have been at time T1.

Next, the rotation of the disks 52 and 53 of the second flywheel unit 205, and the eccentricity at the center of rotation will be explained with reference to FIGS. 7E to 7H.

Figure 7E:
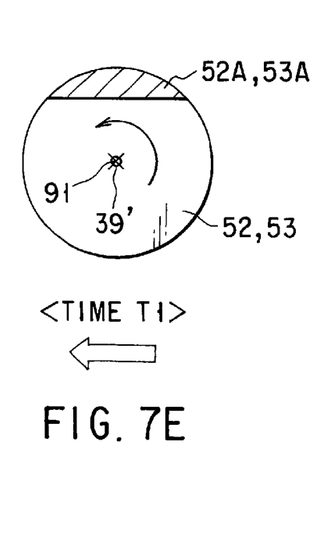

It is assumed that the weights 52A and 53A of the disks 52 and 53 are positioned at the upper side at time T1 as shown in FIG. 7E.

Figure 7F:
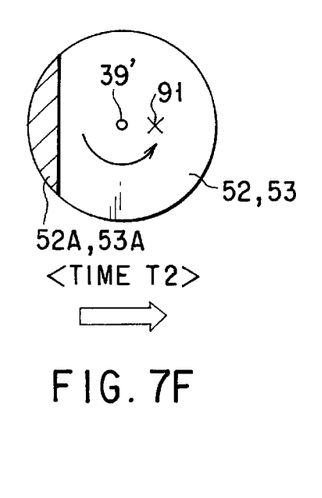

Next, at time T2 at which the disks have been rotated at ¼ in the counterclockwise direction, the weights 52A and 53A of the disks 52 and 53 are positioned at the left side as shown in FIG. 7F. At this time, the cum rod 47B pulls the connection cylinder 41 toward the left side, which is the direction of an arrow shown in the figure, by the second cum mechanism 47 of the exciting section 230, so that the center of rotation 39' of the disks 52 and 53, which is equivalent to the central position 90, is shifted toward the left side from the central position 90 at time T2.

Figure 7G:
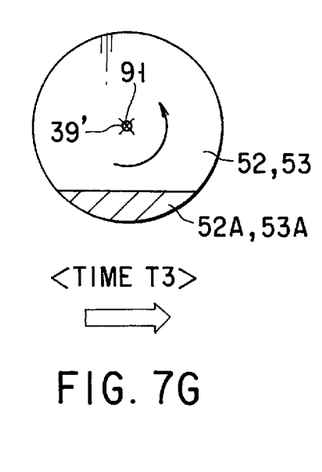

Next, at time T3 at which the disks have been rotated at ¼ in the counterclockwise direction, the weights 52A and 53A of the disks 52 and 53 are positioned at the lower side as shown in FIG. 7G. At this time, the cum rod 47B pushes the connection cylinder 41 toward the right side, which is the direction of an arrow shown in the figure, by the second cum mechanism 47 of the exciting section 230, so that the center of rotation 39' of the disks 52 and 53 becomes equivalent to the initial central position 90 again, at time T3.

Figure 7H:
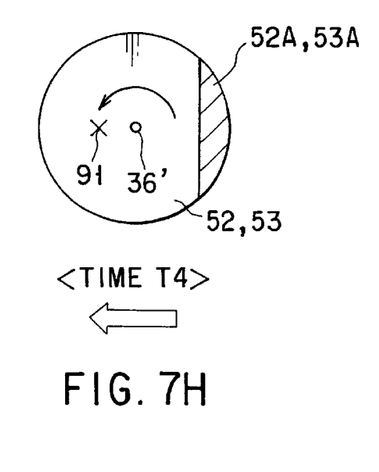

Next, at time T4 at which the disks have been rotated at ¼ in the counterclockwise direction, the weights 52A and 53A of the disks 52 and 53 are positioned at the right side at time T1 as shown in FIG. 7H. At this time, the cum rod 47B pushes the connection cylinder 41 toward the right side, which is the direction of an arrow shown in the figure, by the second cum mechanism 47 of the exciting section 230, so that the center of rotation 39' of the disks 52 and 53, which has been equivalent to the initial central position 90, at time T3 is shifted toward the right side from the central position 90 at time T4. Then, when the disks are rotated at ¼ in the counterclockwise direction, they return to the conditions of time T1.

As described above, the rotary shaft 36 of the disks 50 and 51 which serve as flywheels, and the rotary shaft 39 of the disks 52 and 53 are made mutually eccentric, simultaneously with the rotation of the rotary shaft 36 of the first flywheel unit 204 and the rotation of the rotary shaft 39 of the second flywheel unit 205.

Thus, the increase in the flywheel effect of the flywheel units 204 and 205 can be expected.

Figure 8A:
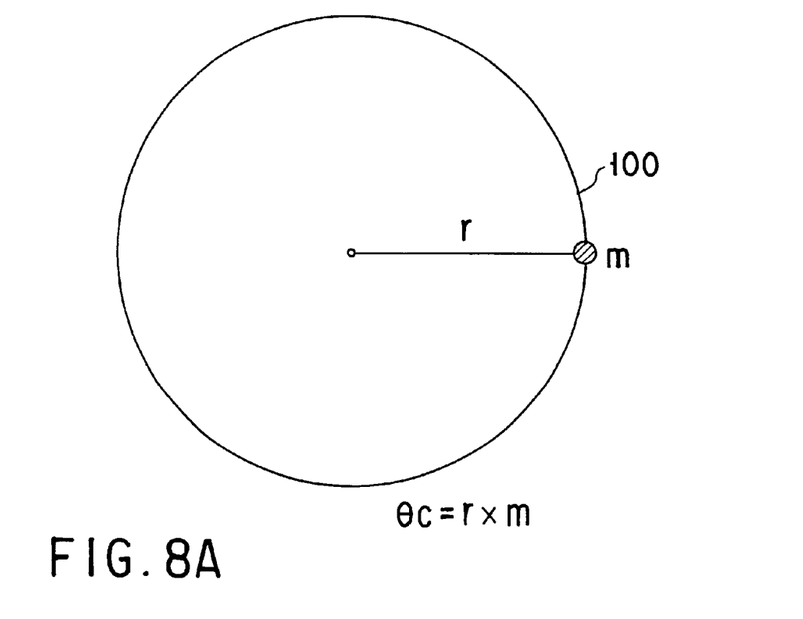
FIGS. 8A and 8B are diagrams explaining the increase in the flywheel effect.

This will be explained with reference to FIGS. 8A and 8B. FIG. 8A illustrates a rotary moment θc of a flywheel disk 100 having a weight of mass m, and θc=r×m, where r represents a distance between the center of rotation and the weight, i.e. a radium of the flywheel disk 100.

Figure 8B:
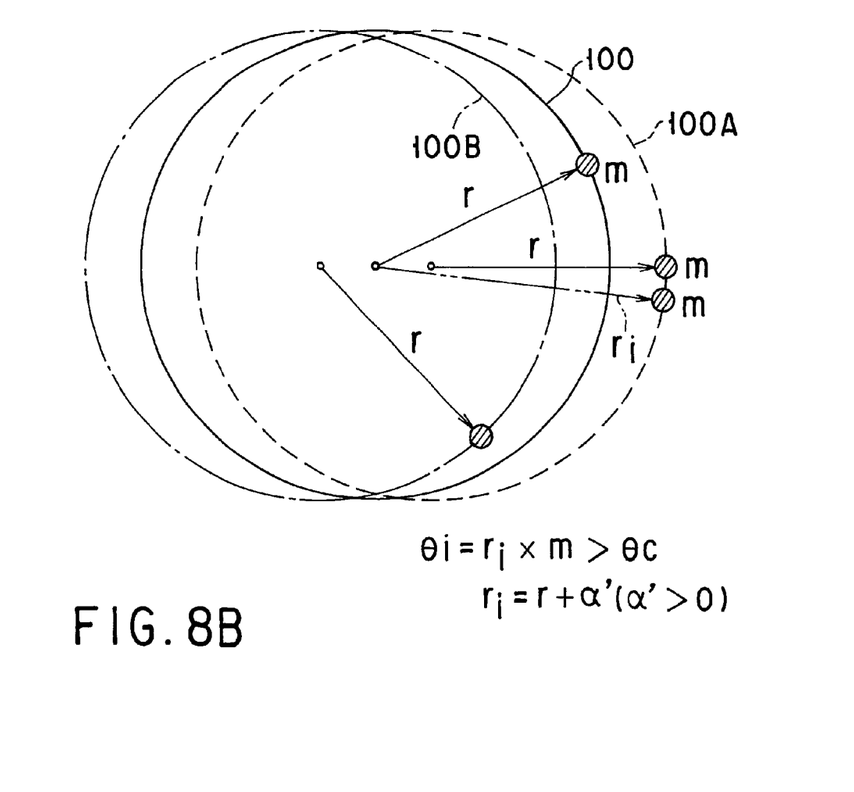

FIG. 8B illustrates a rotary moment θi of the flywheel disk 100 having the weight of mass m when the exciting section 230 is provided as disclosed in the present embodiment, and θi=ri×m where ri represents a distance between the center of rotation of the flywheel disk 100 and the weight, i.e. a radium of the flywheel disk 100.

The radium ri is made substantially larger since the center of rotation of the flywheel disk 100 is made eccentric by the exciting section 230 in accordance with the rotation and the flywheel disk 100 swings as represented by reference numerals 100, 100A and 100B. That is, ri>r where ri=r+α'.

It can be thought that the value of α' corresponds to eccentricity α of the cum mechanism 46 of the exciting section 230.

With reference to the above descriptions, the rotary moment θi when the exciting section 230 is provided and the rotary moment θc when it is not provided have the following relationship:

$$\theta i > \theta c$$

In the present embodiment, the rotary shafts 36 and 39 of the disks 50, 51 and 52, 53 which are flywheels are made eccentric simultaneously with the rotation of the rotary shafts 36 and 39 of the first and second flywheel units 204 and 205. Thus, the rotary moment of the flywheel units 204 and 205 becomes larger and, as a result, the flywheel effect can be made larger.

Further, the discs 50 and 51 of the first flywheel unit 204 are rotated in the opposite direction to that of the rotation of the discs 52 and 53 of the second flywheel unit 205, and the eccentricity of the first flywheel unit 204 is made in the opposite direction to the direction of the eccentricity of the second flywheel unit 205 by the first cam mechanism 46 and the second cam mechanism 47 of the exciting section 230. Therefore, the vibration caused in accordance with the rotation of the discs 50 and 51 of the first flywheel unit 204 and the vibration caused in accordance with the rotation of the discs 52 and 53 of the second flywheel unit 205 can be compensated. As a result, the rotation can be further smoothed in accordance with the increase and the flywheel effect by the exciting section 230 and by the two flywheel units rotating in the mutually opposite directions. In addition, more energy can be stored in the flywheel units, while the mechanical loss caused by the restriction of the vibration can be further reduced. Of course, the principle of conservation of energy precludes the addition of energy at the flywheel sections. Thus, the total energy outputted from the flywheel sections can never exceed the total energy inputted into the flywheel sections.

Figure 9:
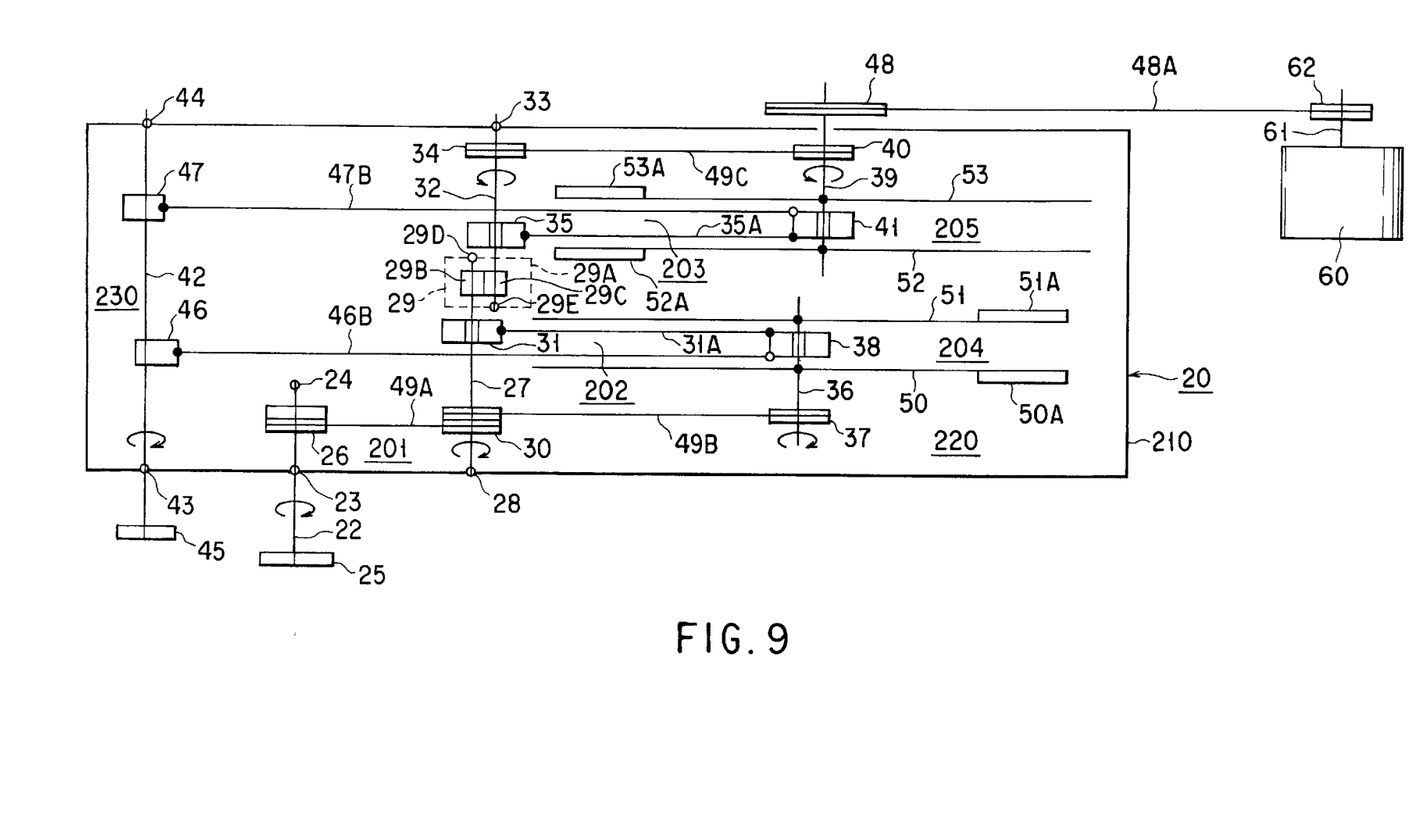
FIG. 9 is a diagram explaining the power transmission in a power generation system according to another embodiment of the present invention.

Next, another embodiment of the present invention will be explained with reference to FIG. 9. In the above-described embodiment, the driving force of the exciting section 230 is obtained from the pulley 26 of the input unit 201. In FIG. 9, however, the pulley 45 of the exciting section 230 is provided outside the frame 210, and the driving force from a prime mover of a power source different from the input unit 210 may be provided to the pulley 45. In this case, the rotation of the pulley 45 or the output of the prime mover should be adjusted so as to allow the operation timing of the exciting section 230 to be synchronized with the operation timing of the flywheel section 220.

As described above, the present invention can provide a power generation system wherein the energy of various energy sources such as a waterwheel, a windmill and the like can be converted into the energy of rotation by a prime mover, the energy of rotation of the prime mover can be effectively taken via the input shaft and the mechanical loss can be further reduced, and the efficiency in the electric power generation can be enhanced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power generation system comprising:
    a power generator; and
    a flywheel apparatus having an input shaft and an output shaft to receive a rotary force via said input shaft and supply the rotary force to said power generator via said output shaft,
    said flywheel apparatus comprising:
        a frame;
        a flywheel section being provided at said frame, and comprising an input unit having said input shaft for receiving the rotary force, a flywheel unit having said output shaft, and a drive unit for transmitting the rotary force from said input unit to said flywheel unit; and
        an exciting section provided at said frame,
    said input unit of said flywheel section comprising:
        bearings provided at said frame;
        a first shaft serving as said input shaft, supported by said bearings;
        an input pulley provided at said first shaft, for receiving the rotary force; and
        a first pulley provided at said first shaft,
    said drive unit of said flywheel section comprising:
        bearings provided at said frame;
        a second shaft supported by said bearings;
        a second pulley provided at said second shaft;
        a first belt looped over said first pulley and said second pulley; and
        a support cylinder provided at said second shaft,
    said flywheel unit of said flywheel section comprising:
        a support rod having an end fixed at said support cylinder;
        a connection cylinder at which another end of said support rod is fixed;
        a third shaft serving as an output shaft passing through said connection cylinder;
        a third pulley provided at said third shaft;
        a second belt looped over said second pulley and said third pulley; and
        a flywheel disk provided at said third shaft,
    said exciting section comprising:
        a drive unit constituted by bearings provided at said frame, a cam shaft supported by said bearings, a fourth pulley provided at said cam shaft, and a third belt looped over said first pulley and said fourth pulley; and
        a cam unit being provided at said cam shaft, and having one end exciting to allow said connection cylinder to reciprocate in accordance with the rotation of said cam shaft.

2. A power generation system according to claim 1, wherein said flywheel section comprises a plurality of flywheel units.

3. A power generation system according to claim 1, wherein said flywheel section comprises a plurality of flywheel disks.

4. A power generation system according to claim 1, wherein said flywheel section comprises a plurality of flywheel disks rotated in mutually opposite directions.

5. A power generation system according to claim 1, wherein said exciting section is driven by the rotary force via said input shaft.

6. A power generation system according to claim 1, wherein said exciting section is driven by a rotary force different from the rotary force via said input shaft.

7. A power generation system according to claim 1, wherein said flywheel apparatus is constituted such that said third shaft serving as the rotary shaft of said flywheel disk is provided to be horizontal.

8. A power generation system comprising:
    a base;
    a power generator being mounted at said base, and having a rotary shaft and a pulley at which said rotary shaft is provided; and
    a flywheel apparatus being mounted at said base, and having an input shaft and output shaft, to receive a rotary force via said input shaft and supply the rotary force to said power generator via said output shaft,
    said flywheel apparatus comprising:
        a frame provided at said base;
        a flywheel section being provided at said frame, and having an input unit having said input shaft, first and second flywheel units having said output shaft, and first and second drive units for transmitting the rotary force from said input unit to said first and second flywheel units; and
        an exciting section provided at said frame,
    said input unit comprising:
        a first bearing and a second bearing provided at said frame;
        a first shaft serving as said input shaft, supported by said first and second bearings;
        an input pulley provided at said first shaft, for receiving a rotary force ; and
        a first pulley provided at said first shaft,
    said first drive unit of said flywheel section comprising:
        a third bearing and a fourth bearing provided at said frame;
        a second shaft supported by said third and fourth bearings;
        a first gear provided at said second shaft;
        a second pulley provided at said second shaft;
        a first belt looped over said first pulley and said second pulley; and
        a first support cylinder provided at said second shaft,
    said second drive unit of said flywheel section comprising:
        a fifth bearing and a sixth bearing provided at said frame;
        a third shaft supported by said fifth and sixth bearings;
        a second gear provided at said third shaft, for engaging with said first gear and rotating in a direction opposite to the direction of rotation of said first gear;
        a third pulley provided at said third shaft; and
        a second support cylinder provided at said third shaft,
    said first flywheel unit of said flywheel section comprising:
        a first support rod having one end fixed at said first support cylinder;

a first connection cylinder at which another end of said first support rod is fixed, and which has a first recess portion and a first pin hole;

a fourth shaft provided to pass through said first connection cylinder;

a fourth pulley provided at said fourth shaft;

a second belt looped over said second pulley and said fourth pulley;

a first disk and a second disk provided at said fourth shaft;

a first weight and a second weight provided at said first and second disks; and a first fixing pin inserted into said first pin hole of said first connection cylinder, said second flywheel unit of said flywheel section comprising:

a second support rod having one end fixed at said second support cylinder;

a second connection cylinder at which another end of said second support rod is fixed, and which has a second recess portion and a second pin hole;

a fifth shaft serving as said output shaft, which is provided to pass through said second connection cylinder and which at which said output pulley is provided;

a fifth pulley provided at said fifth shaft;

an output belt looped over said fifth pulley and said pulley of said power generator;

a third belt looped over said third pulley and said fifth pulley;

a third disk and a fourth disk provided at said fifth shaft;

a third weight and a fourth weight provided at said third and fourth disks; and a second fixing pin inserted into said second pin hole of said second connection cylinder, said exciting section comprising:

a seventh bearing and an eighth bearing provided at said frame;

a cam shaft supported by said seventh and eighth bearings;

a sixth pulley provided at said cam shaft;

a fourth belt looped over said first pulley and said sixth pulley;

a first eccentric cam plate provided at said cam shaft;

a first pin for fixing said first eccentric plate at said cam shaft;

a first cam bearing having said first eccentric cam plate provided at an inner peripheral side thereof;

a first cam receiver provided at said inner peripheral side of said first cam bearing;

a first cam rod having one end connected to said first cam receiver and having a third pin hole provided at another end thereof, and having another end fixed rotatably at said first recess portion of said first connection cylinder by said first pin hole, said third pin hole and said first fixing pin;

a second eccentric cam plate provided at said cam shaft;

a second pin for fixing said second eccentric cam plate at said cam shaft;

a second cam bearing having said second eccentric cam plate provided at an inner peripheral side thereof;

a second cam receiver provided at said inner peripheral side of said cam bearing; and a second cam rod having one end connected to said second cam receiver and having a fourth pin hole provided at another end thereof, and having another end fixed rotatably at said second recess portion of said second connection cylinder by said second pin hole, said fourth pin hole and said second fixing pin.

9. A power generation system according to claim 8, wherein said exciting section is driven by the rotary force via said input shaft.

10. A power generation system according to claim 8, wherein said exciting section is driven by a rotary force different from the rotary force via said input shaft.

11. A power generation system according to claim 8, wherein said fourth and sixth bearings, and said first and second gears constitute a gear unit.

12. A power generation system according to claim 8, wherein said flywheel apparatus is mounted at said base so that the fourth and fifth shafts serving as the rotary shafts of said flywheel disk are horizontal.

* * * * *

UNITED STATES PATENT AND TRADEMARK OFFICE
CERTIFICATE OF CORRECTION

PATENT NO. : 6,365,981 B1
DATED : April 2, 2002
INVENTOR(S) : M. Tokita

It is certified that error appears in the above-identified patent and that said Letters Patent is hereby corrected as shown below:

<u>Title page,</u>
Item [74], *Attorney, Agent, or Firm,* "Johnson & Kindness" should read -- Johnson Kindness --

<u>Column 10,</u>
Line 42, "force ; and" should read -- force; and --

<u>Column 11,</u>
Line 24, "and which at which" should read -- and at which --

Signed and Sealed this

Twenty-sixth Day of November, 2002

*Attest:*

*Attesting Officer*

JAMES E. ROGAN
*Director of the United States Patent and Trademark Office*